(12) United States Patent
Kim

(10) Patent No.: US 8,913,870 B2
(45) Date of Patent: Dec. 16, 2014

(54) METHOD OF CAPTURING MOVING PICTURE AND APPARATUS FOR REPRODUCING MOVING PICTURE

(71) Applicant: Samsung Electronics Co. Ltd., Suwon-si (KR)

(72) Inventor: Ji-Young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/858,468

(22) Filed: Apr. 8, 2013

(65) Prior Publication Data

US 2014/0086561 A1    Mar. 27, 2014

(30) Foreign Application Priority Data

Sep. 26, 2012    (KR) ........................ 10-2012-0107240

(51) Int. Cl.
| | |
|---|---|
| H04N 5/92 | (2006.01) |
| H04N 21/4147 | (2011.01) |
| H04N 9/79 | (2006.01) |
| H04N 21/845 | (2011.01) |
| H04N 21/44 | (2011.01) |
| H04N 21/433 | (2011.01) |
| H04N 21/439 | (2011.01) |
| H04N 5/76 | (2006.01) |

(52) U.S. Cl.
CPC ............. *H04N 9/79* (2013.01); *H04N 21/4147* (2013.01); *H04N 21/8456* (2013.01); *H04N 21/44008* (2013.01); *H04N 21/4334* (2013.01); *H04N 21/4394* (2013.01); *H04N 5/76* (2013.01)
USPC ........................................... 386/241; 386/239

(58) Field of Classification Search
None
See application file for complete search history.

(56) References Cited

U.S. PATENT DOCUMENTS

| | | | |
|---|---|---|---|
| 2007/0093203 A1* | 4/2007 | Jang .............................. | 455/3.06 |
| 2008/0303903 A1* | 12/2008 | Bentley et al. ................ | 348/143 |
| 2010/0188577 A1* | 7/2010 | Jing et al. ..................... | 348/559 |

FOREIGN PATENT DOCUMENTS

| | | | |
|---|---|---|---|
| KR | 10-2009-0043526 A1 | | 5/2009 |
| WO | 2008/024723 A2 | | 2/2008 |

\* cited by examiner

*Primary Examiner* — William C Vaughan, Jr.
*Assistant Examiner* — Eileen Adams
(74) *Attorney, Agent, or Firm* — Jefferson IP Law, LLP

(57) ABSTRACT

A method and an apparatus for capturing video data and audio data according to reproduction of a moving picture stream are provided. In an apparatus for reproducing the moving picture, a moving picture feature section at a capture instruction time is determined as a capture section for audio data and video data decoded from the moving picture stream when a capture instruction is input while the moving picture stream is reproduced. Next, audio data and video data corresponding to the capture section among the audio data and the video data decoded from the moving picture stream are captured.

20 Claims, 9 Drawing Sheets

METHOD OF CAPTURING MOVING PICTURE AND APPARATUS FOR REPRODUCING MOVING PICTURE

PRIORITY

This application claims the benefit under 35 U.S.C. §119(a) of a Korean patent application filed on Sep. 26, 2012 in the Korean Intellectual Property Office and assigned Serial No. 10-2012-0107240, the entire disclosure of which is hereby incorporated by reference.

BACKGROUND OF THE INVENTION

1. Field of the Invention

The present invention relates to an apparatus for reproducing a moving picture. More particularly, the present invention relates to a method and an apparatus for capturing a moving picture while the moving picture is being reproduced.

2. Description of the Related Art

A screen capture function is one of a plurality of functions of a moving picture reproducing apparatus for reproducing a moving picture from a moving picture stream. In this disclosure, the term "moving picture" is used as including video data and audio data. The screen capture function is a function capable of capturing a screen displayed according to a moving picture reproduction. When a user inputs a capture instruction by controlling the moving picture reproducing apparatus reproducing the moving picture, the moving picture reproducing apparatus captures a displayed screen at a capture time point. In general, the moving picture reproducing apparatus stores a still image of the display screen in an image file form at the capture time point.

As described above, since the still image at the capture moment is captured, a picture quality is not good. Further, since the still image is not the moving picture, the use of the still image may be limited. In addition, only the still image is captured, and audio data of the moving picture which is being reproduced is not captured.

As a function for improving such matters, a video editing function may be used. When the video editing function is used, the moving picture in a section set by the user can be captured. Since the moving picture includes video and audio, the captured moving picture includes the video data and the audio data.

However, in order to capture the moving picture by using the video editing function, the user should directly set a capture section whenever the user desires to capture the moving picture, making this process inconvenient to the user. Further, this process is cumbersome in that the user should set the capture section by directly selecting a start point and an end point to be captured from the moving picture while identifying video and/or audio of the moving picture. In addition, as the user directly selects the start point and the end point to be captured, it is difficult for the user to accurately set the moving picture section to be captured as the capture section. That is, it is required that the user pay close attention in order not to unnecessarily include a part of the moving picture adjacent to the moving picture section which the user desires to capture.

Therefore, a need exists for a system and method for addressing these issues.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for capturing a moving picture by which a user can conveniently capture the moving picture while the moving picture is reproduced.

Another aspect of the present invention is to provide a method and an apparatus for capturing a moving picture in a moving picture feature section at a capture instruction time while the moving picture is reproduced.

Yet another aspect of the present invention is to provide a method and an apparatus for capturing the moving picture in at least one section of a video feature section and an audio feature section of the moving picture at a capture instruction time while the moving picture is reproduced.

In accordance with an aspect of the present invention, a method of capturing a moving picture in a moving picture reproducing apparatus is provided. The method includes determining a moving picture feature section at a capture instruction time as a capture section for audio data and video data decoded from the moving picture stream when a capture instruction is input while a moving picture stream is reproduced, and capturing audio data and video data corresponding to the capture section among the audio data and the video data decoded from the moving picture stream.

In accordance with another aspect of the present invention, an apparatus for reproducing a moving picture is provided. The apparatus includes a moving picture reproducer for reproducing a moving picture stream, a temporary memory for temporarily storing audio data and video data decoded from the moving picture stream, a capture memory for storing captured video data and audio data, an input interface for inputting a capture instruction, and a controller for determining a moving picture feature section at a capture instruction time as a capture section for the temporarily stored audio data and video data decoded from the moving picture stream when a capture instruction is input while a moving picture stream is reproduced, and for capturing audio data and video data corresponding to the capture section from the temporary memory storing the audio data and video data decoded from the moving picture stream.

In accordance with yet another aspect of the present invention, a method of capturing a moving picture from a moving picture stream being reproduced by a reproducing apparatus is provided. The method includes inputting a capture instruction, determining a moving picture feature section at a time of the capture instruction as a capture section for audio data and video data decoded from the moving picture stream, and capturing audio data and video data corresponding to the capture section included in the audio data and the video data decoded from the moving picture stream.

In accordance with still another aspect of the present invention, capturing apparatus for capturing a moving picture from a moving picture stream being reproduced by a reproducing apparatus is provided. The capturing apparatus includes a temporary memory for temporarily storing audio data and video data decoded from the moving picture stream, an input interface for inputting a capture instruction, a controller for determining a moving picture feature section at a capture instruction time as a capture section for the stored audio data and video data, and for capturing audio data and video data corresponding to the capture section from the temporarily stored audio data and video data decoded from the moving picture stream, and a capture memory for storing the captured video data and audio data from the temporarily stored audio data and video data decoded from the moving picture stream.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, exemplary embodiments of the present invention will be described with reference to examples to which a moving picture reproducing apparatus is applied. However, the exemplary embodiments of the present invention may be applied to other apparatuses having a similar background. Further, those skilled in the art may apply the exemplary embodiments of the present invention to other apparatuses through variations without departing from the scope of the present invention. That is, the present invention may be applied to a digital TeleVision (TV) receiver or a desktop computer, a laptop computer, a tablet computer, a camcorder, a digital camera, a smart phone and the like which have a moving picture reproducing capability as well as a dedicated moving picture reproducing apparatus such as a Digital Video Disc (DVD) player or a Portable Multimedia Player (PMP) and the like.

Figure 1:
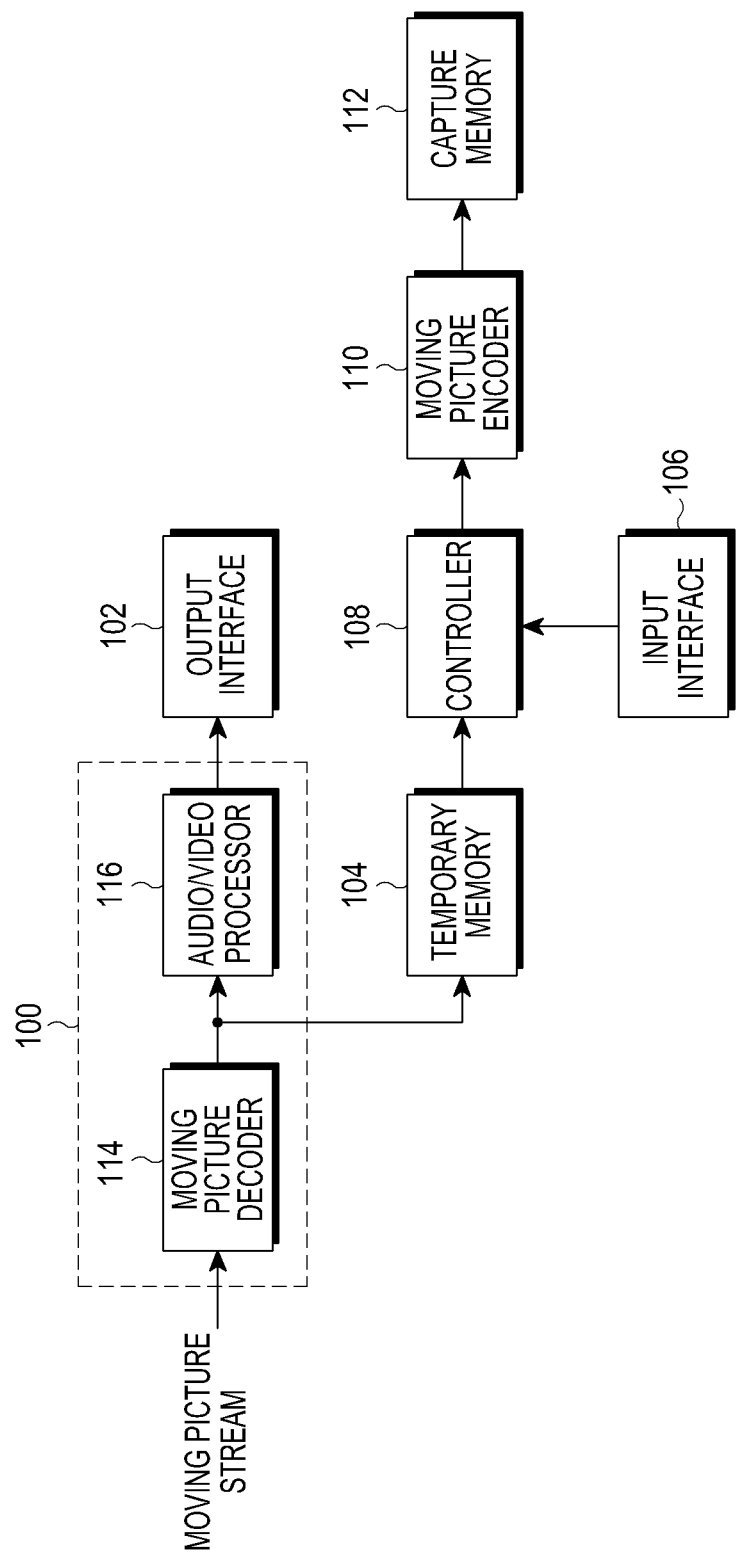
FIG. 1 is a block diagram of a moving picture reproducing apparatus including a moving picture capture function according to an exemplary embodiment of the present invention.

FIG. 1 is a block diagram of a moving picture reproducing apparatus including a moving picture capture function according to an exemplary embodiment of the present invention.

Referring to FIG. 1, the moving picture reproducing apparatus includes a moving picture reproducer 100, an output interface 102, a temporary memory 104, an input interface 106, a controller 108, a moving picture encoder 110, and a capture memory 112. In a general moving picture reproducing apparatus to which the present invention is applied, components which are not required for describing the moving picture capture function according to an exemplary embodiment of the present invention are not illustrated in FIG. 1 and thus omitted.

The moving picture reproducer 100 decodes and reproduces a moving picture stream. The moving picture reproducer 100 includes a moving picture decoder 114 and an audio/video processor 116. The moving picture decoder 114 decodes the moving picture stream to generate audio data and video data. The audio/video processor 116 generates a video signal for outputting a screen according to the decoded video data and outputs the video signal to the output interface 102, and generates an audio signal for outputting audio according to the decoded audio data and outputs the audio signal to the output interface 102. Similarly to the general moving picture reproducing apparatus, the moving picture decoder 114 may be implemented by a hardware or a software executed by the controller 108.

The output interface 102 is a user interface for providing the user with an output of the moving picture reproducing apparatus. The output interface 102 includes output devices such as a speaker and a display which are not shown. The output interface 102 outputs the audio and the video according to the audio signal and the video signal generated by the audio/video processor 116. Further, the output interface 102 also outputs various screens according to an operation of the controller 102.

The temporary memory 104 temporarily stores the audio data and video data decoded by the moving picture decoder 114. The temporary memory 104 is a memory of a First In First Out (FIFO) type, where earliest stored audio data and video data are deleted whenever new audio data and video data are stored. Accordingly, the audio data and the video data stored in the temporary memory 104 are continuously updated in accordance with reproduction of the moving picture stream. As described below, the controller 108 determines a capture section for the audio data and the video data temporarily stored in the temporary memory 104 and captures the audio data and the video data in the determined capture section. Accordingly, an amount of the audio data and the video data temporarily stored in the temporary memory 104 is set to an amount corresponding to a reproduction time required for determining the capture section and capturing the moving picture. However, as the amount of the audio data and the video data temporarily stored in the temporary memory 104 are larger, a storage capacity of the temporary memory 104 may become larger, a time spent on determining the capture section may be increased, and the capture section may become excessively long. Particularly, when the captured moving picture is desired to be used instead of the still image captured according to the general screen capture function, the captured moving picture having a long reproduction time is not desirable. By considering such matters, the amount of the audio data and the video data temporarily stored in the temporary memory 104 is preferably set to an amount ranging from several seconds to dozens of seconds. A flash memory or a Hard Disk Drive (HDD) may be used as the temporary memory 104.

The input interface 106 is a user interface through which the moving picture reproducing apparatus receives an input from the user. The input interface 106 provides the controller 108 with inputs by which the user instructs various operations of the moving picture reproducing apparatus according a control of the user. The input through the input interface 106 includes a capture instruction, and a capture condition setting. The input interface 106 may include input devices such as a keypad, a keyboard, or a button.

The display included in the output interface 102 may be a touch screen display. In this case, the touch screen display is included in the input device of the input interface 106 as well. The touch screen display provides a user interface through a screen. The touch screen display displays a graphic and a text on the screen, and detects and responds to a contact on the screen. The apparatus employing the touch screen display can display one or more of a soft key, a menu, and other user interface objects on the screen. The user can make an input related to the user interface object to the apparatus employing the touch screen display by being in contact with the screen in a position corresponding to the user interface object.

The moving picture encoder 110 encodes the audio data and the video data captured by the controller 108 into a moving picture file. Similarly to the moving picture decoder 114, the moving picture encoder 110 may be implemented by the hardware or the software executed by the controller 108. A type of moving picture file format may be selectively set by the user from moving picture file formats supportable by the moving picture encoder 110.

The capture memory 112 stores the moving picture file encoded by the moving picture encoder 110. The flash memory or the HDD may be used as the capture memory 112.

The controller 108 controls operations of the moving picture reproducer 100, the output interface 102, the temporary memory 104, the input interface 106, the moving picture encoder 110, and the capture memory 112. As the controller 108, a processor (or controller) adopted as a main controller in the general moving picture reproducing apparatus can additionally execute the moving picture capture function according to an exemplary embodiment of the present invention. Unlike the above, a dedicated processor (or controller) for executing only the moving picture capture function according to an exemplary embodiment of the present invention may be used, or dedicated hardware may be implemented.

When a capture instruction is input from the user through the input interface 106 while the moving picture stream is reproduced by the moving picture reproducer 100 and then output through the output interface 102, the controller 108 executes the moving picture capture function according to an exemplary embodiment of the present invention. The controller 108 determines a moving picture feature section at a capture instruction time as a capture section for the audio data and the video data temporarily stored in the temporary memory 104 and captures the audio data and the video data in the capture section.

Further, the controller 108 encodes the captured audio data and video data into a moving picture file by the moving picture encoder 110 and stores the moving picture file in the capture memory 112. In an actual implementation of an exemplary embodiment of the present invention, if it is not required to convert the captured audio data and video data to the moving picture file, it is also not required to use the moving picture encoder 110. In this case, the audio data and the video data captured by the controller 108 are stored in the capture memory 112 without being encoded.

Figure 2:
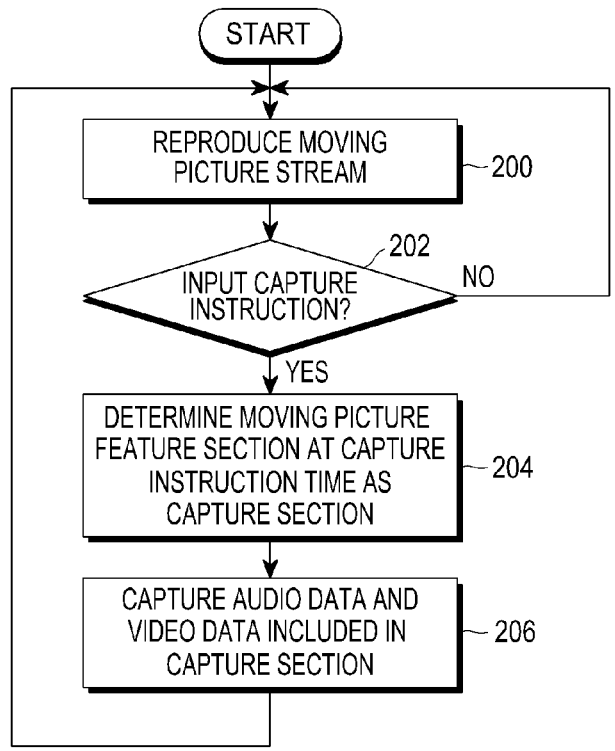
FIG. 2 is a flowchart of capturing a moving picture according to an exemplary embodiment of the present invention.

FIG. 2 is a flowchart of capturing the moving picture according to an exemplary embodiment of the present invention.

Referring to FIG. 2, when a capture instruction is input from the user through the input interface 106 in step 202 while the moving picture stream is reproduced by the moving picture reproducer 100 and output through the output interface 102 in step 200, the controller 108 executes the moving picture function in steps 204 to 206. In step 204, the controller 108 determines a moving picture feature section at a capture instruction time as a capture section for audio data and video data temporarily stored in the temporary memory 104.

The moving picture feature section at the capture instruction time corresponds to a section, which includes a moving picture at the capture instruction time and a moving picture including at least a part of moving picture features at the capture instruction time among moving pictures being continuous with the moving picture at the capture instruction time.

The moving picture feature may include a video feature and an audio feature. The video feature may be, for example, a background, an object, a face of a person included in a screen at the capture instruction time. The audio feature may be, for example, voice, and music included in an audio at the capture instruction time.

One of the video feature section, the audio feature section, and a setting time section may be detected as the moving picture feature section. Accordingly, the capture section may be determined as one of the video feature section, the audio feature section, and the setting time section. The video feature section may be a section, which includes a video at the capture instruction time and a video including at least a part of video features at the capture instruction time among videos being continuous with the video at the capture instruction time. The audio feature section may be a section, which includes an audio at the capture instruction time and an audio including at least a part of audio features at the capture instruction among audios being continuous with the audio at the capture instruction time. The setting time section is a section for the setting time, and may be a section corresponding to a predetermined reproduction time including the capture instruction time. Accordingly, at least some features of the audio feature and the video feature at the capture instruction time may be included only in some section instead of entire setting time sections. However, since the setting time section includes the capture instruction time, at least some section of the setting time section includes at least some features of the audio feature and the video feature at the capture instruction time. Each of the video feature section, the audio feature section, and the setting time section is detected by the controller 108.

The video feature section is detected from the video data temporarily stored in the temporary memory 104 by the controller 108. The video feature section may be detected based on at least one preset feature of various video features at the capture instruction time as described below. The audio feature section is detected from the audio data temporarily stored in the temporary memory 104 by the controller 108. The audio feature section may be detected based on at least one preset feature of various audio features at the capture instruction time as described below. The setting time section is detected from the reproduction time for the video data and the audio data temporarily stored in the temporary memory 104 by the controller 108. A setting time of the setting time section may be set by the user or may be set to a default.

Figure 3:
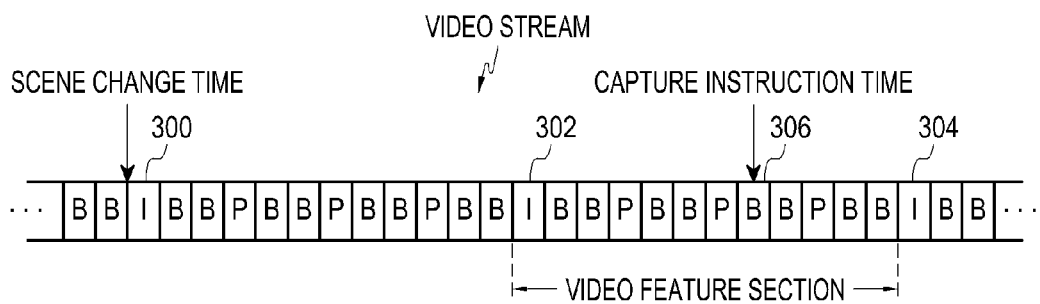
FIG. 3 illustrates an example of detecting a video feature section according to an exemplary embodiment of the present invention.

FIG. 3 illustrates an example of detecting the video feature section according to an exemplary embodiment of the present invention. FIG. 3 shows an example of detecting the video feature section based on an I (Intra Frame Picture) frame related to a video frame at the capture instruction time. The video frame at the capture instruction time refers to a frame which is being reproduced at the capture instruction time.

In general, a video stream of the moving picture stream consists of consecutive video frames as illustrated in FIG. 3, and types of video frames include an I frame, a P (Predicted Frame Picture) frame and a B (Bi-directional Frame Picture) frame. The I frame refers to a frame of a screen encoded with only information of one screen without prediction for screens of previous and next frames, the P frame refers to a frame of a screen generated from the I frame or a previous P frame through prediction, and the B frame refers to a frame of a screen generated through bi-directional prediction of each of the I frame and the P frame.

Accordingly, P frames and B frames associated with one I frame correspond to the video feature of the corresponding I frame. That is, screen of one I frame, screens of P frames associated with the corresponding I frame, and screens of B frames associated with the corresponding I frame include at least some features of any one frame. As illustrated in FIG. 3, when the video frame at the capture instruction time is the B frame 306, the I frame associated with the B frame 306 is the I frame 302. In this case, the I frame 302 and video frames associated with the I frame 302 correspond to screens with at least some features of the B frame 306. Video frames associated with the I frame 302 represent P frames and B frames located between the I frame 302 and a next I frame 304.

Accordingly, when the capture instruction time is defined as illustrated in FIG. 3, the controller 108 may be set to detect the I frame 302 and the video frames associated with the I frame 302 as the video feature section.

Meanwhile, one moving picture consists of one or more scenes, and screens of the I frames adjacent to each other in one scene commonly have at least some video features or may become screens similar to or associated with each other. For example, when a scene change is made at a scene change time illustrated in FIG. 3, I frames 300 to 304 after the scene change are included in one scene, so that the I frames 300 to 304 may commonly have at least some video features or become screens similar to or associated with each other. Since detecting the scene change is a technique generally known to those skilled in the art, a detailed description will be omitted.

Accordingly, when the capture instruction time is defined as illustrated in FIG. 3, the controller 108 may be set to detect the I frames 300 to 304 included in one scene and video frames associated with the I frames 300 to 304 as the video feature section instead of the video feature section illustrated in FIG. 3.

In an actual implementation of an exemplary embodiment of the present invention, when the video feature section is detected based on the I frame similarly to FIG. 3, the number of I frames included in the video feature section may be preset by the user. Such a setting may be performed by the user through a menu, an icon and the like provided by the input interface 106 similarly to general user setting modes. The number of I frames may be set to a default in case the user does not separately set the number of I frames.

As another example, the video feature section may be detected based on a face included in the screen at the capture instruction time. When the face is detected from the screen at the capture instruction time, the controller 108 can detect consecutive video frames including the detected face as the video feature section. That is, the controller 108 can detect consecutive video frames including the detected face as the video feature section among the video frame at the capture instruction time and video frames before and after the capture instruction time. At this time, a plurality of faces may be included in the screen at the capture instruction time. In this case, the controller 108 can detect video frames consecutively including at least one face of the detected faces as the video feature section from the screen at the capture instruction time. Since detecting the faces included in the screen is a technique generally known to those skilled in the art, a detailed description will be omitted.

Although two examples of detecting the video feature section based on the video feature have been described, they are only examples for helping understanding of the present invention, and the present invention is not limited thereto. It may be understood by those skilled in the art that the video feature section can be detected based on other types of video feature such as a background, an object or the like other than the two examples.

The controller 108 detects one preset video feature section among various types of video feature sections including the above described examples from the video data temporarily stored in the temporary memory 104. Unlike the above, the controller 108 may be set to control the video feature section based on two or more types of video feature. For example, the controller 108 may be set to detect the video feature section based on both the background and the face at the capture instruction time. That is, frames where both the background and the face at the instruction time are all detected may be detected as the video feature section. Meanwhile, the face may not be included in the screen at the capture instruction time. By considering such a matter, the video feature section is detected first based on the face, and when the face is not detected, the video feature section may be detected based on the I frame.

Figure 4:
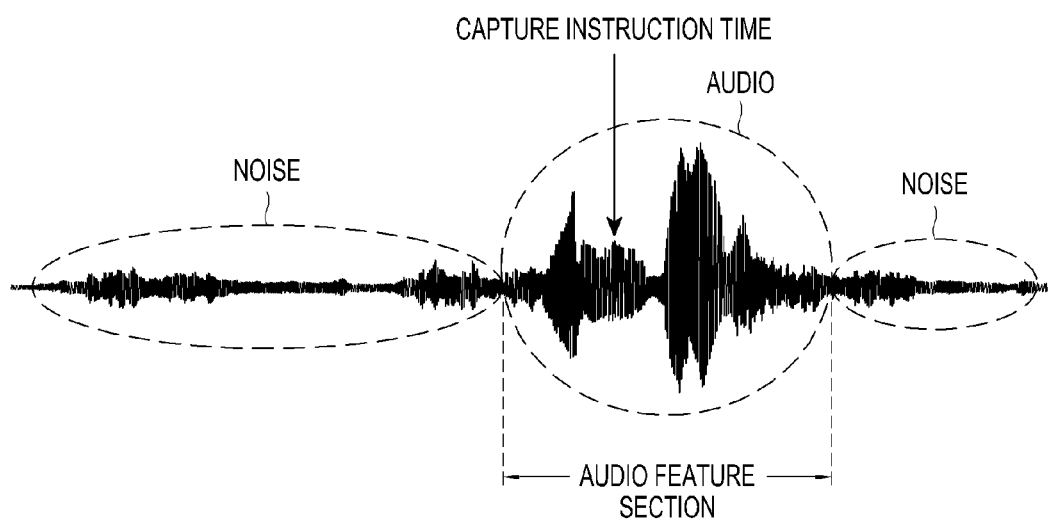
FIG. 4 illustrates an example of detecting an audio feature section according to an exemplary embodiment of the present invention.

FIG. 4 illustrates an example of detecting the audio feature section according to an exemplary embodiment of the present invention. FIG. 4 shows an example of detecting the audio feature section based on an audio at the capture instruction time, and an audio section including an audio at the capture instruction time is detected as the audio feature section in the example. The audio at the capture instruction time refers to an audio which is being reproduced at the capture instruction time.

In general, a noise section and an audio section may be divided from consecutive audio signals. For example, when an audio signal waveform according to audio data is defined as illustrated FIG. 4, a section where only the noise exists is the noise section, and a section where an actual audio exists is the audio section. Accordingly, when the capture instruction time is defined as illustrated in FIG. 4, the controller 108 can detect the audio section including the audio at the capture instruction time as the audio feature section as illustrated in FIG. 4. Since detecting the audio section from the consecutive audio signals is a technique generally known to those skilled in the art, a detailed description will be omitted.

As another example, the audio feature section may be detected based on a voice at the capture instruction time. The controller 108 can detect a voice section including a voice at the capture instruction time as the audio feature section. In general, a voice frequency band used for voice transmission or signal processing ranges from 200 Hz to 3,000 Hz. Accordingly, the controller 108 can detect the voice section where audio data of the voice frequency is continuous as the audio feature section among the audio data before and after the capture instruction time.

As still another example, the audio feature section may be detected based on an audio frequency at the capture instruction time. The controller 108 can detect a predetermined frequency range section including the audio frequency at the capture instruction time as the audio feature section. That is, the section where differences between the audio frequency at the capture instruction time and frequencies within a predetermined range based on the audio frequency at the capture instruction time, for example, frequencies within 50% are continuous may be detected as the audio feature section.

Although three examples of detecting the audio feature section based on the audio feature have been described, they are only for helping understanding of the present invention, and the present invention is not limited thereto. It may be understood by those skilled in the art that the audio feature section can be detected based on other types of audio feature such as an instrument sound or the like other than the three examples described above.

The controller 108 detects one preset audio feature section among various types of audio feature sections including the above described examples from the audio data temporarily stored in the temporary memory 104. Unlike the above, the controller 108 may be set to control the audio feature section based on two or more types of audio feature. For example, the controller 108 may be set to detect the audio feature section based on both the voice and the instrument sound at the capture instruction time. That is, the audio section where both the voice and the instrument sound at the capture instruction time are all detected may be detected as the audio feature section. Meanwhile, the voice may not be included in the audio at the capture instruction time. By considering such a matter, the audio feature section is detected first based on the voice, and when the voice is not detected, the audio feature section may be detected based on the audio.

It may be set such that only one section of the video feature section and the audio feature section is fixedly detected as the moving picture feature section. However, one or both of the video feature section and the audio feature section may not be detected according to types of video feature and audio feature set to be detected and contents of the moving picture to be captured. For example, when it is set such that the video feature section is detected based on the I frame, there may be the moving picture where the I frame does not exist among the video data temporarily stored in the temporary memory 104. As an example, there may be a moving picture filming a lecture. In an extreme case, only one I frame may exist in an entire moving picture. As another example, when it is set such that the audio feature section is detected based on the audio, there may be the moving picture where the voice does not exist among the audio data temporarily stored in the temporary memory 104. As an example, there may be a moving picture filming scenery.

By considering such a matter, it is preferable but not necessary to set in advance a capture priority for the video feature, the audio feature, and the setting time which are the basis to determine the capture section and then attempt to sequentially detect the video feature, the audio feature, and the setting time one by one according to the priority. As described above, the setting time section is the section corresponding to the predetermined reproduction time including the capture instruction time. A period between the capture instruction time and the start point of the setting time section and a period between the capture instruction time and the end point of the setting time section may be freely preset by the user or may be set to a default. In the following description, it will be described as an example that the start point of the setting time section is a point before ½ of the predetermined reproduction time from the capture instruction time, and the end point of the setting time section is a point after ½ of the predetermined reproduction time from the capture instruction time. Further, a period between the capture instruction time and the point before ½ of the predetermined reproduction time is referred to as a "first half", and a period between the capture instruction time and the point after ½ of the predetermined reproduction time is referred to as a "second half". Since the setting time section may be detected from reproduction time information, the setting time section can be always detected even though the video feature section or the audio feature section are not detected. The capture priority may be set by the user through the menu, the icon and the like provided by the input interface 106 similarly to the user setting modes. The capture priority may be set to a default in case the capture priority is not separately set by the user.

Figure 5:
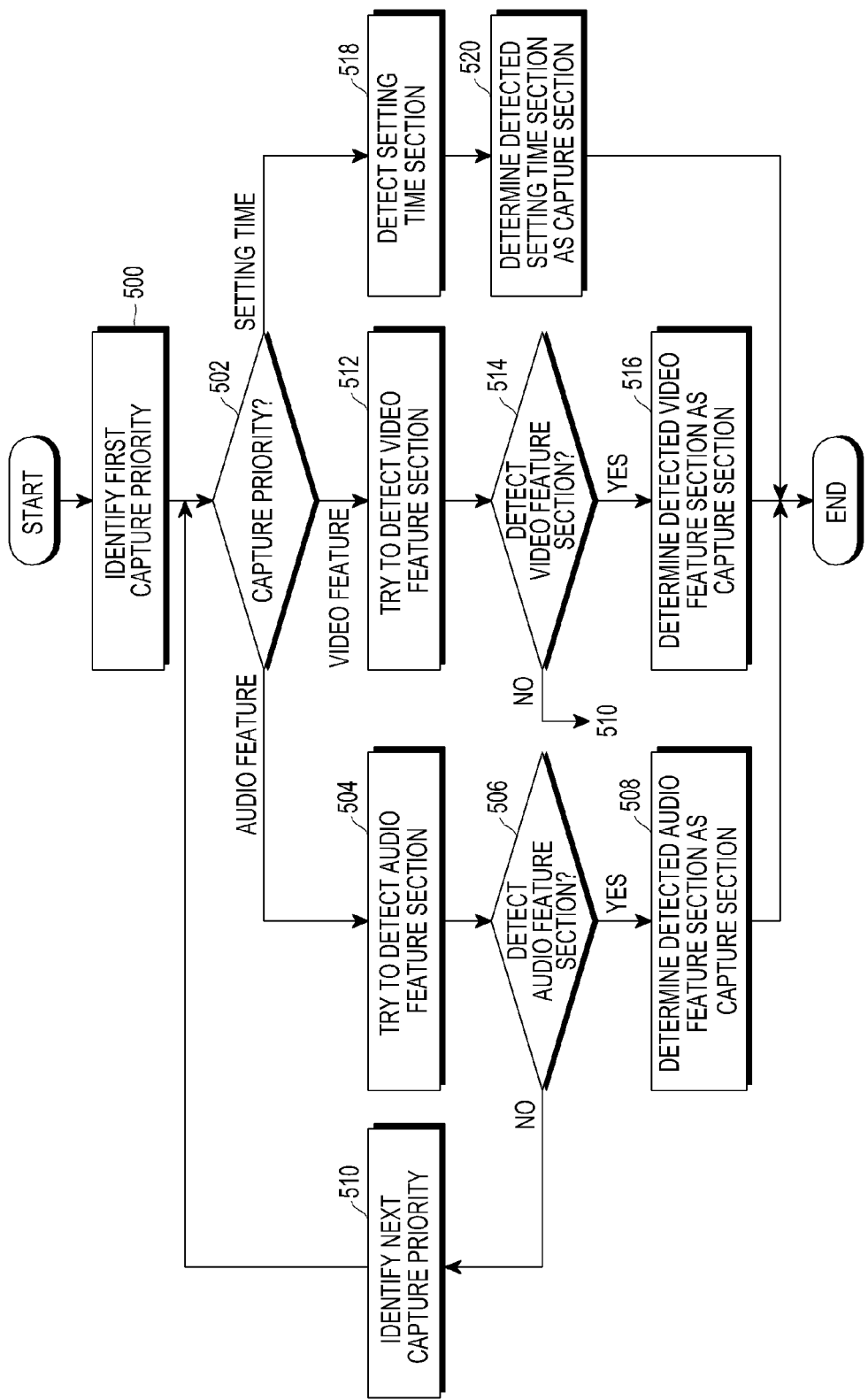
FIG. 5 is a flowchart of determining a capture section according to an exemplary embodiment of the present invention.

FIG. 5 is a flowchart of determining the capture section according to an exemplary embodiment of the present invention. Steps illustrated in FIG. 5 show detailed examples of step 204 of FIG. 2.

Referring to FIG. 5, the controller 108 identifies a first capture priority in step 500. Further, the controller 108 proceeds to one of steps 504, 512, and 518 from step 502 according to the identified capture priority.

When the identified capture priority is the audio feature, the controller 108 attempts to detect the audio feature section from the audio data temporarily stored in the temporary memory 104 in step 504. Next, the controller 108 identifies whether the audio feature section is detected in step 506. When the audio feature section is detected, the controller 108 determines the detected audio feature section as the capture section in step 508.

When the identified capture priority is the video feature, the controller 108 attempts to detect the video feature section from the reproduction time information associated with the video data temporarily stored in the temporary memory 104 in step 512. Next, the controller 108 identifies whether the video feature section is detected in step 514. When the video feature section is detected, the controller 108 determines the detected video feature section as the capture section in step 516.

When the identified capture priority is the setting time, the controller 108 detects the setting time section from the audio data and the video data temporarily stored in the temporary memory 104 in step 518. Next, the controller 108 determines the detected setting time section as the capture section in step 520.

When it is identified that the audio feature section is not detected in step 506 or it is identified that the video feature section is not detected in step 514, the controller 108 proceeds to step 502 after identifying a next capture priority in step 510. Accordingly, when the currently identified capture priority is the audio feature section or the video feature section, an attempt to detect a section having a next capture priority is made if the corresponding section is not detected, and a detected section is determined as the capture section if the corresponding section is detected.

Therefore, one of the audio feature section, the video feature section, and the setting time section is determined as the capture section according to the preset capture priority.

Figure 6A:
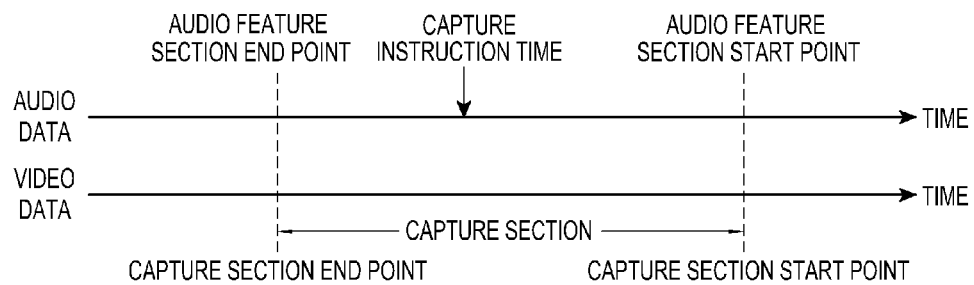
FIGS. 6A to 6C illustrate examples of determining a capture section according to an exemplary embodiment of the present invention.
Figure 6B:
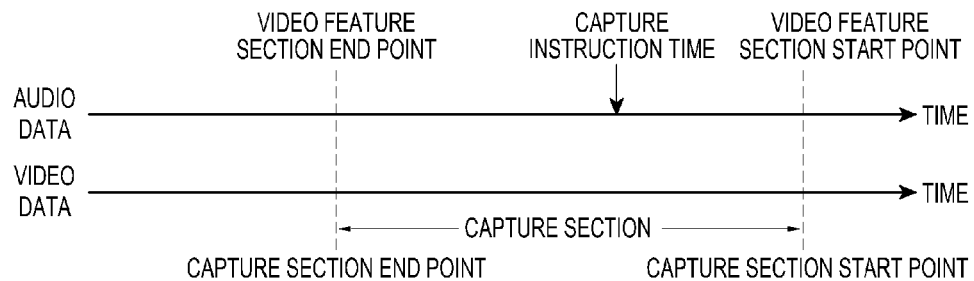
Figure 6C:
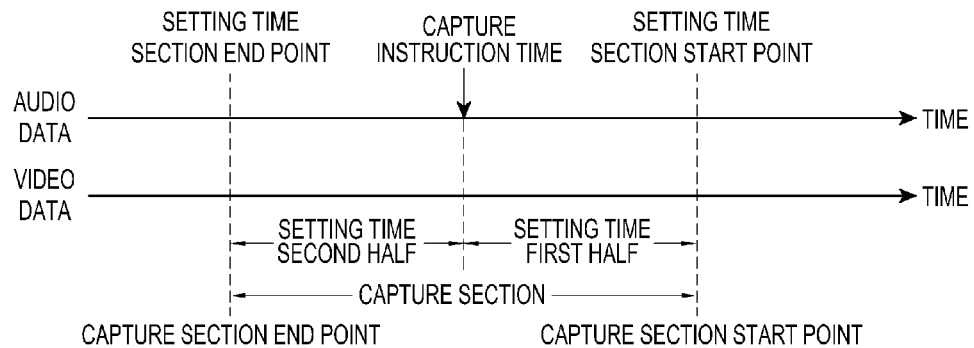

FIGS. 6A to 6C illustrate examples of determining the capture section according to an exemplary embodiment of the present invention. FIG. 6A shows an example where the detected audio feature section is determined as the capture section.

Referring to FIG. 6A, a start point and an end point of the audio feature section at the capture instruction time are determined as a start point and an end point of the capture section, respectively.

FIG. 6B shows an example where the detected video feature section is determined as the capture section. Referring to FIG. 6B, a start point and an end point of the video feature section at the capture instruction time are determined as a start point and an end point of the capture section, respectively.

FIG. 6C shows an example where the detected setting time section is determined as the capture section. Referring to FIG. 6C, a start point and an end point of the setting time section including the capture instruction time are determined as a start point and an end point of the capture section, respectively.

Referring back to FIG. 2, after the capture section is determined as described above, the controller 108 captures audio data and video data corresponding to the capture section from the audio data and the video data temporarily stored in the temporary memory 104 in step 206 and then returns to step 200.

Accordingly, when there is the capture instruction while the moving picture is reproduced, audio data and video data corresponding to the moving picture feature section at the capture instruction time are captured.

Figure 7A:
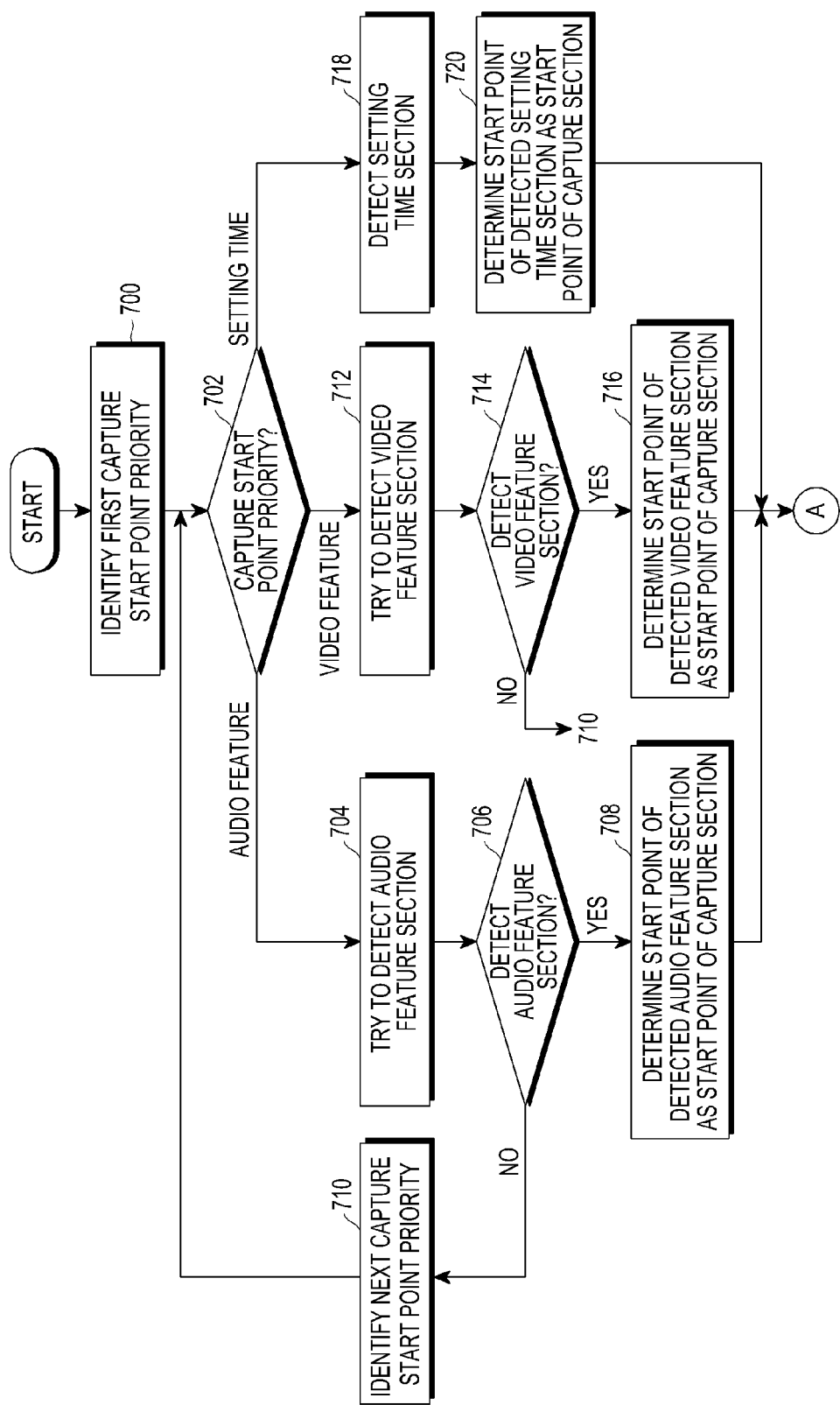
FIGS. 7A and 7B are flowcharts of determining a capture section according to another exemplary embodiment of the present invention.
Figure 7B:
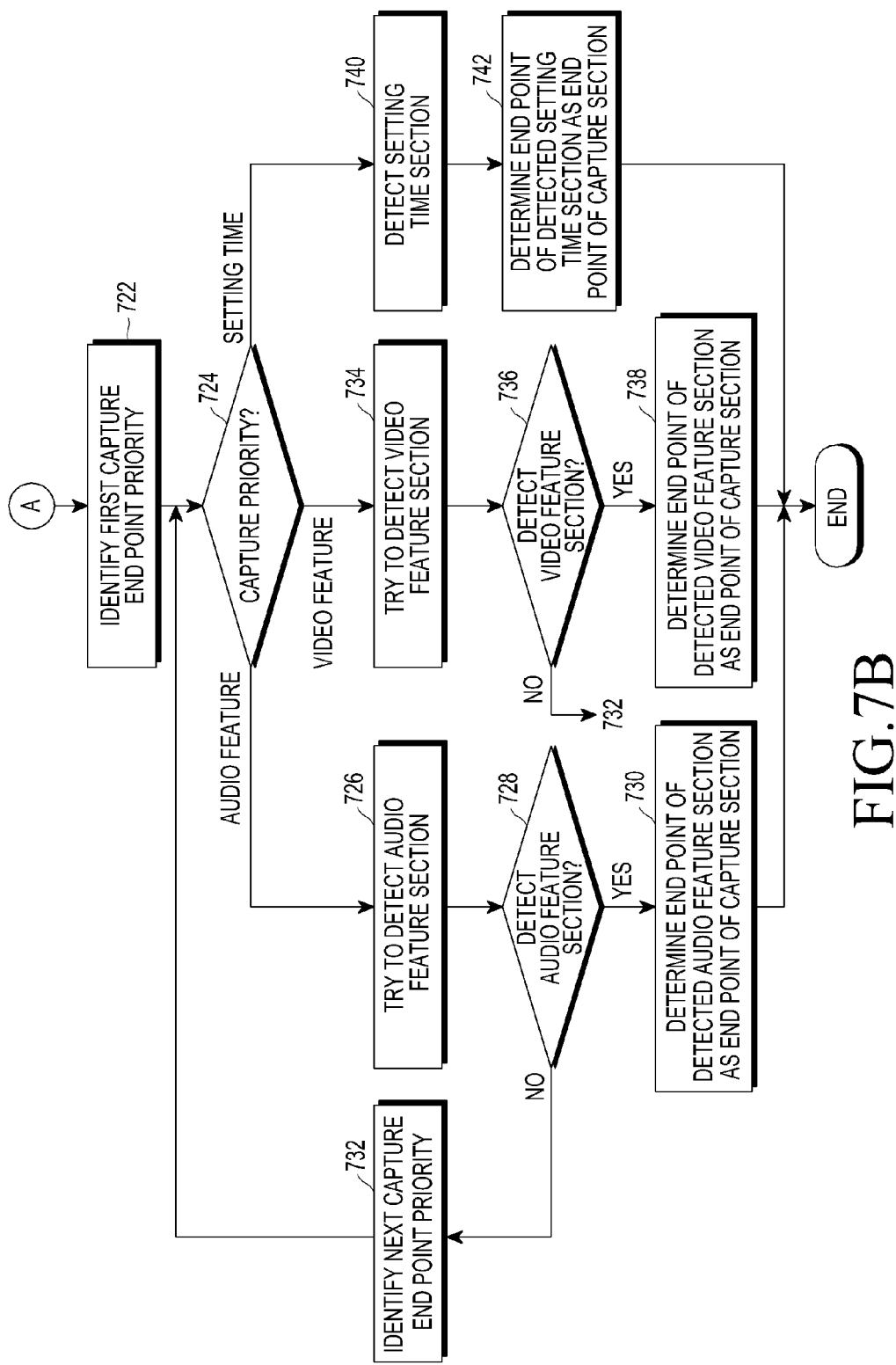

FIGS. 7A and 7B are flowcharts of determining the capture section according to another exemplary embodiment of the present invention, and are consecutive by reference numeral "A". Steps illustrated in FIGS. 7A and 7B show other detailed examples of step 204 of FIG. 2. FIGS. 7A and 7B shows an exemplary embodiment where one of the audio feature section, the video feature section, and the setting time section is determined as the capture section or a combination of two sections is determined as the capture section. That is, one of the start points of the audio feature section, the video feature section, and the setting time section is determined as the start point of the capture section, and one of the end points of the audio feature section, the video feature section, and the setting time section is determined as the end point of the capture section. Further, the capture priority is set for the video feature, the audio feature, and the setting time which are the basis to determine the start point and the end point of the capture section, and then the start and end points are sequentially detected according to the priority. The capture start point priority and the capture end point priority may be set by the user through the menu, the icon and the like provided by the input interface 106 similarly to the general user setting modes. The capture start point priority and the capture end point priority may be set to a default in case the capture start point priority and the capture end point priority are not separately set by the user.

Referring to FIGS. 7A and 7B, the controller 108 identifies a first capture start point priority in step 700. Further, the controller 108 proceeds to one of steps 704, 712, and 718 from step 702 according to the identified capture start point priority.

When the identified capture start point priority is the audio feature, the controller 108 attempts to detect the audio feature section from the audio data temporarily stored in the temporary memory 104 in step 704. Next, the controller 108 identifies whether the audio feature section is detected in step 706. When the audio feature is detected, the controller 108 determines the start point of the detected audio feature section as the start point of the capture section in step 708.

When the identified capture start point priority is the video feature, the controller 108 attempts to detect the video feature section from the video data temporarily stored in the temporary memory 104 in step 712. Next, the controller identifies whether the video feature section is detected in step 714. When the video feature section is detected, the controller 108 determines the start point of the detected video feature section as the start point of the capture section in step 716.

When the identified capture start point priority is the setting time, the controller 108 detects the setting time section from the reproduction time information associated with the audio data and the video data temporarily stored in the temporary memory 104 in step 718. Next, the controller 108 determines the start point of the detected setting time section as the start point of the capture section in step 720.

When it is identified that the audio feature section is not detected in step 706 or it is identified that the video feature section is not detected in step 714, the controller 108 proceeds to step 702 after identifying a next capture start priority in step 710. Accordingly, when the currently identified capture start point priority is the start point of the audio feature section or the start point of the video feature section, an attempt to detect a section having a next capture start priority is made if the corresponding section is not detected, and the start point of the detected section is determined as the start point of the capture section if the corresponding section is detected.

After the start point of the capture section is determined as described above, the controller 108 identifies a first capture end point priority in step 722. Further, the controller 108 proceeds to one of steps 726, 734, and 740 from step 724 according to the identified capture end point priority.

When the identified capture end point priority is the audio feature, the controller 108 attempts to detect the audio feature section from the audio data temporarily stored in the temporary memory 104 in step 726. Next, the controller 108 identifies whether the audio feature section is detected in step 728. When the audio feature is detected, the controller 108 determines the end point of the detected audio feature section as the end point of the capture section in step 730.

When the identified capture end point priority is the video feature, the controller 108 attempts to detect the video feature section from the video data temporarily stored in the temporary memory 104 in step 734. Next, the controller identifies whether the video feature section is detected in step 736. When the video feature section is detected, the controller 108 determines the end point of the detected video feature section as the end point of the capture section in step 738.

When the identified capture end point priority is the setting time, the controller 108 detects the setting time section from the reproduction time information associated with the audio data and the video data temporarily stored in the temporary memory 104 in step 740. Next, the controller 108 determines the end point of the detected setting time section as the end point of the capture section in step 742.

When it is identified that the audio feature section is not detected in step 728 or it is identified that the video feature section is not detected in step 736, the controller 108 proceeds to step 724 after identifying a next capture end point priority in step 732. Accordingly, when the currently identified capture end point priority is the end point of the audio feature section or the end point of the video feature section, an attempt to detect a section having a next capture end point priority is made if the corresponding section is not detected, and the end point of the detected section is determined as the end point of the capture section if the corresponding section is detected.

Accordingly, a combination of one start point of the audio feature section, the video feature section, and the setting time section and one end point of the audio feature section, the video feature section, and the setting time section is determined as the capture section according to the preset capture start point priority and capture end point priority Therefore, one capture section of the three capture sections as illustrated in FIGS. 6A to 6C and six capture sections as illustrated in FIGS. 8A to 8F are determined.

Figure 8A:
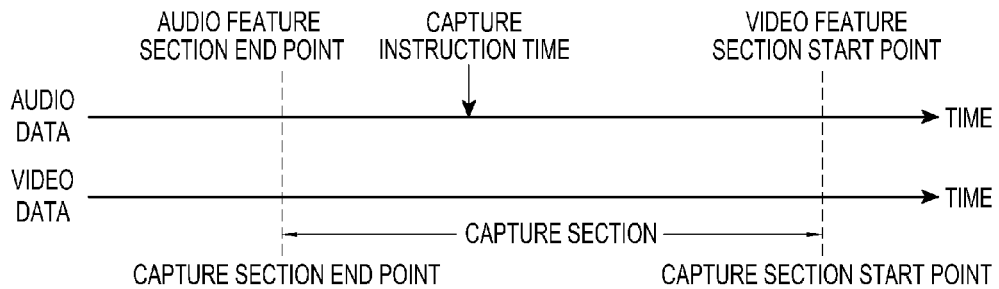
FIGS. 8A to 8F illustrate examples of determining a capture section according to another exemplary embodiment of the present invention.
Figure 8B:
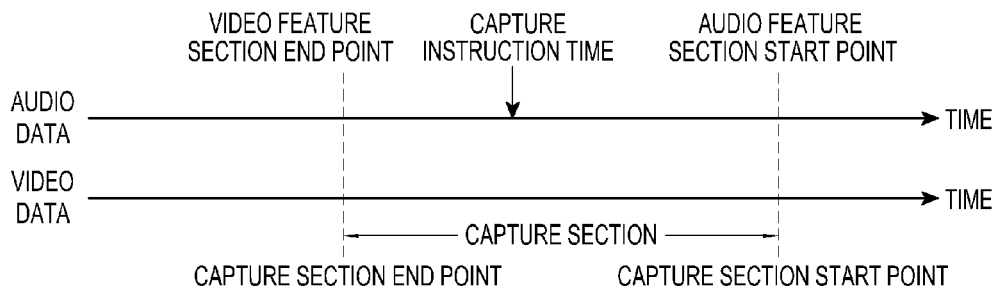
Figure 8C:
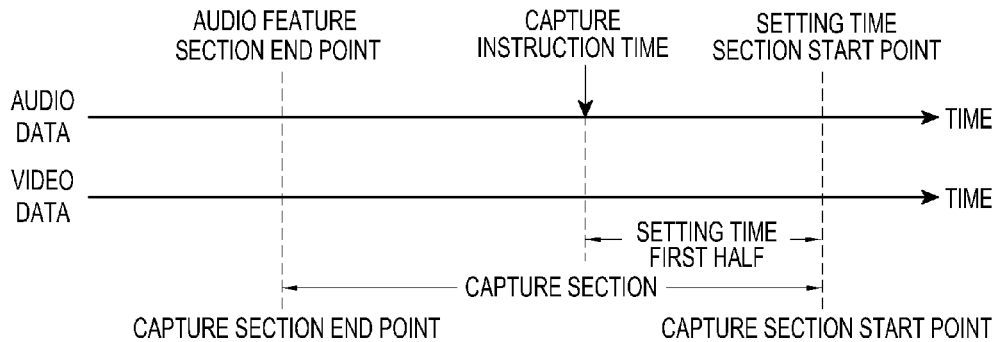
Figure 8D:
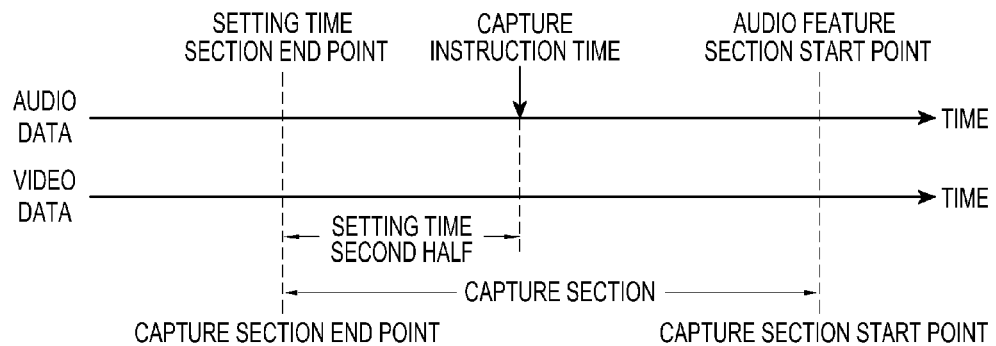
Figure 8E:
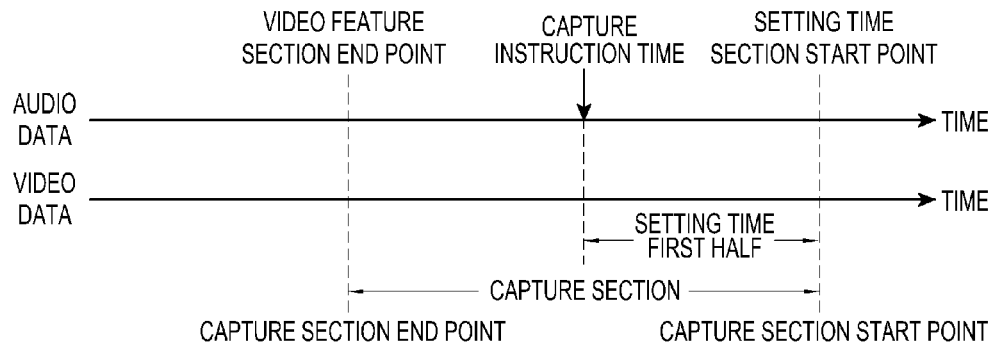
Figure 8F:
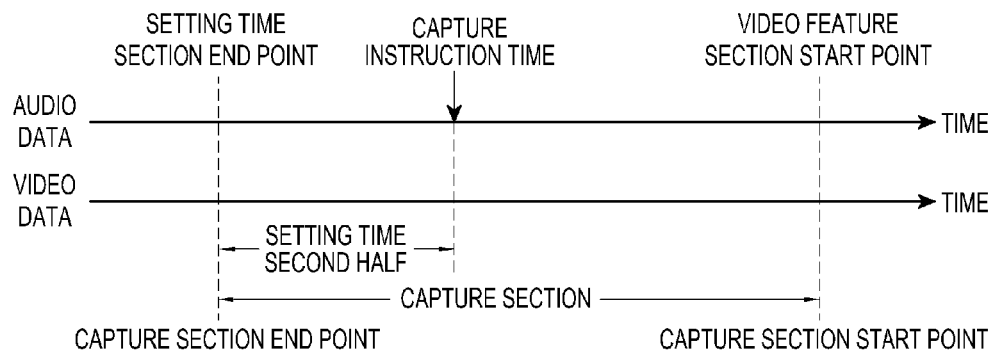

FIGS. 8A to 8F illustrate examples of determining the capture section according to another exemplary embodiment of the present invention. FIG. 8A shows an example where the start point of the detected video feature section and the end point of the detected audio feature section are determined as the start point and the end point of the capture section, respectively. FIG. 8B illustrates an example where the start point of the detected audio feature section and the end point of the detected video feature section are determined as the start point and the end point of the capture section, respectively. FIG. 8C shows an example where the start point of the detected setting time section and the end point of the detected audio feature section are determined as the start point and the end point of the capture section, respectively. FIG. 8D shows an example where the start point of the detected audio feature section and the end point of the detected setting time section are determined as the start point and the end point of the capture section, respectively. FIG. 8E shows an example where the start point of the detected setting time section and the end point of the detected video feature section are determined as the start point and the end point of the capture section, respectively. FIG. 8F shows an example where the start point of the detected video feature section and the end point of the detected setting time section are determined as the start point and the end point of the capture section, respectively.

According to the exemplary embodiments of the present invention described above, the moving picture in the section corresponding to the feature of the moving picture which is being reproduced at the capture instruction time is captured. Accordingly, when the user instructs to capture a desired scene while the moving picture of contents such as a drama and a movie is being reproduced, the moving picture in the moving picture feature section at the capture instruction time is automatically captured. Therefore, the user can capture the moving picture showing feature of a dialog part, an audio or video part, or a part that the user desires to repeatedly study and the like through only a simple control of inputting the capture instruction. Accordingly, the user does not need to directly set the capture section whenever the user desires to capture video and/or audio from the moving picture. Further, the user does not need to set the capture section by selecting the start point and the end point of the moving picture to be captured while identifying a video and/or audio of the moving picture, which causes inconvenience to the user.

In addition, since the capture in a short section may be easily performed, the user can easily share the captured part with another user. Furthermore, since a shortly captured moving picture utilizes a very small amount of memory, the captured moving picture can be used in various places where a still image is mainly used, which creates new uses to the moving picture. For example, the shortly captured moving picture of the user can be uploaded to a part of a contact number, various Social Networking Services (SNSs), a blog and the like where a picture of the user, an icon and the like are registered.

When the moving picture capturing method according to the exemplary embodiments of the present invention is used in a mobile device, the mobile device can use a program to capture the moving picture by downloading the program (for example, application) from a remotely located program providing apparatus (for example, server) or installing the program and then executing the program. That is, when the program for capturing the moving picture is installed in the mobile device, the program is executed in the mobile device and then provides the moving picture capture. The program providing apparatus transmits the program to the mobile device automatically or in response to a program transmission request from the mobile device. At this time, for the mobile device, the program providing apparatus can additionally perform the determination on whether the user subscribes to a service, a user authentication, a payment information identification and the like. The program providing apparatus may include a communication unit for communicating with the mobile device wirelessly or through a wire, a storage medium for storing the program, and a controller for transmitting the program to the mobile device through the communication unit. The storage medium may be located inside or outside the program providing apparatus.

Although concrete exemplary embodiments of the present invention have been described in the detailed description of the present invention, various modifications can be made to the exemplary embodiments without departing from the scope of the present invention. For example, although the example of capturing the audio data and the video data from the moving picture stream has been described in the exemplary embodiments of the present invention, the present invention can be applied to a case where the audio data is captured from the audio stream.

Further, the exemplary embodiments of the present invention may be implemented in a form of hardware, or a combination of hardware and software. Such software may be stored in a non-transitory volatile or nonvolatile storage device such as a Read Only Memory (ROM), a Random Access Memory (RAM) or the like, or a storage medium, which can be optically or magnetically recorded and read by a machine, such as a Compact Disc (CD), a Digital Versatile Disc (DVD), a magnetic disc, a magnetic tape or the like regardless of, for example, deletion possibility or re-recording possibility. Accordingly, an exemplary embodiment of the present invention includes a program including a code for implementing the apparatus and the method described in the claims and a non-transitory machine (computer and the like)-readable storage medium for storing the program. Further, the program may be electronically transferred through a predetermined medium such as a communication signal transmitted through wired or wireless connection, and an exemplary embodiment of the present invention properly includes equivalents.

Therefore, the scope of the present invention should be defined by equivalents of the claims as well as the claims, but is not limited to the above described exemplary embodiments.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of capturing a moving picture in a moving picture reproducing apparatus, the method comprising:
   determining a moving picture feature section at a capture instruction time as a capture section for audio data and video data decoded from a moving picture stream when a capture instruction is input while the moving picture stream is reproduced; and
   capturing audio data and video data corresponding to the capture section among the audio data and the video data decoded from the moving picture stream,
   wherein the determining of the moving picture feature section comprises:
   detecting a start point of one section of a video feature section, an audio feature section, a setting time section from the audio data and the video data decoded from the moving picture stream according to a preset capture start point priority; and
   determining the detected start point as a start point of the capture section;
   detecting an end point of one section of the video feature section, the audio feature section, the setting time section from the audio data and the video data decoded from the moving picture stream according to a preset capture end point priority; and
   determining the detected end point as an end point of the capture section,
   wherein the video feature section is a section which includes a video at the capture instruction time and a video including at least a part of video features at the capture instruction time among videos being continuous with the video at the capture instruction,
   the audio feature section is a section which includes an audio at the capture instruction time and an audio including at least a part of audio features at the capture instruction time among audios being continuous with the audio at the capture instruction time, and
   the setting time section is a section corresponding to a predetermined reproduction time including the capture instruction time.

2. The method of claim 1, wherein the moving picture feature section is a section which includes a moving picture at the capture instruction time and a moving picture including at least a part of moving picture features at the capture instruction time among moving pictures being continuous with the moving picture at the capture instruction time.

3. The method of claim 1, wherein the determining of the moving picture feature section further comprises:
   detecting one section of a video feature section, an audio feature section, and a setting time section from the audio data and the video data decoded from the moving picture stream according to a preset capture priority; and
   determining the detected section as the capture section,
   wherein the video feature section is a section which includes a video at the capture instruction time and a video including at least a part of video features at the capture instruction time among videos being continuous with the video at the capture instruction,
   the audio feature section is a section which includes an audio at the capture instruction time and an audio including at least a part of audio features at the capture instruction time among audios being continuous with the audio at the capture instruction time, and
   the setting time section is a section corresponding to a predetermined reproduction time including the capture instruction time.

4. The method of claim 3, wherein the video feature section is a section corresponding to consecutive video frames including at least one I frame among video frames of a scene including a video frame at the capture instruction time.

5. The method of claim 3, wherein the video feature section is a section corresponding to consecutive video frames including a face detected at the capture instruction time.

6. The method of claim 3, wherein the audio feature section is an audio section including an audio at the capture instruction time.

7. The method of claim 3, wherein the audio feature section is a voice section including a voice at the capture instruction time.

8. The method of claim 3, wherein the audio feature section is a predetermined frequency range section including an audio frequency at the capture instruction time.

9. The method of claim 1, further comprising encoding the captured audio data and video data into a moving picture file.

10. An apparatus for reproducing a moving picture, the apparatus comprising:
    a moving picture reproducer for reproducing a moving picture stream;
    a temporary memory for temporarily storing audio data and video data decoded from the moving picture stream;
    a capture memory for storing captured video data and audio data;
    an input interface for inputting a capture instruction; and
    a controller for determining a moving picture feature section at a capture instruction time as a capture section for the temporarily stored audio data and video data decoded from the moving picture stream when the capture instruction is input while the moving picture stream is reproduced, and for capturing audio data and video data corresponding to the capture section from the temporary memory temporarily storing the audio data and video data decoded from the moving picture stream,
    wherein the controller detects a start point of one section of a video feature section, an audio feature section, a setting time section according to a preset capture start point priority and an end point of one section according to a preset capture end point priority from the audio data and the video data decoded from the moving picture stream, and determines the detected start point and end point as a start point and an end point of the capture section,
    wherein the video feature section is a section which includes a video at the capture instruction time and a video including at least a part of video features at the capture instruction time among videos being continuous with the video at the capture instruction,
    the audio feature section is a section which includes an audio at the capture instruction time and an audio including at least a part of audio features at the capture instruction time among audios being continuous with the audio at the capture instruction time, and
    the setting time section is a section corresponding to a predetermined reproduction time including the capture instruction time.

11. The apparatus of claim 10, wherein the moving picture feature section is a section which includes a moving picture at the capture instruction time and a moving picture including at least a part of moving picture features at the capture instruction time among moving pictures being continuous with the moving picture at the capture instruction time.

12. The apparatus of claim 10, wherein the controller further detects one section of a video feature section, an audio feature section, and a setting time section from the audio data and the video data decoded from the moving picture stream according to a preset capture priority, and determines the detected section as the capture section,
- wherein the video feature section is a section which includes a video at the capture instruction time and a video including at least a part of video features at the capture instruction time among videos being continuous with the video at the capture instruction,
- the audio feature section is a section which includes an audio at the capture instruction time and an audio including at least a part of audio features at the capture instruction among audios being continuous with the audio at the capture instruction time, and
- the setting time section is a section corresponding to a predetermined reproduction time including the capture instruction time.

13. The apparatus of claim 12, wherein the controller detects a section corresponding to consecutive video frames including at least one I frame among video frames of a scene including a video frame at the capture instruction time as the video feature section.

14. The apparatus of claim 12, wherein the controller detects a section corresponding to consecutive video frames including a face detected at the capture instruction time as the video feature section.

15. The apparatus of claim 12, wherein the controller detects an audio section including an audio at the capture instruction time as the audio feature section.

16. The apparatus of claim 12, wherein the controller detects a voice section including a voice at the capture instruction time as the audio feature section.

17. The apparatus of claim 12, wherein the controller detects a predetermined frequency range section including an audio frequency at the capture instruction time as the audio feature section.

18. The apparatus of claim 10, further comprising a moving picture encoder for encoding the captured audio data and video data into a moving picture file.

19. A method of capturing a moving picture from a moving picture stream being reproduced by a reproducing apparatus, the method comprising:
- inputting a capture instruction;
- determining a moving picture feature section at a time of the capture instruction as a capture section for audio data and video data decoded from the moving picture stream; and
- capturing audio data and video data corresponding to the capture section included in the audio data and the video data decoded from the moving picture stream,
- wherein the determining of the moving picture feature section comprises:
- detecting a start point of one section of a video feature section, an audio feature section, a setting time section from the audio data and the video data decoded from the moving picture stream according to a preset capture start point priority; and
- determining the detected start point as a start point of the capture section;
- detecting an end point of one section of the video feature section, the audio feature section, the setting time section from the audio data and the video data decoded from the moving picture stream according to a preset capture end point priority; and
- determining the detected end point as an end point of the capture section,
- wherein the video feature section is a section which includes a video at the capture instruction time and a video including at least a part of video features at the capture instruction time among videos being continuous with the video at the capture instruction,
- the audio feature section is a section which includes an audio at the capture instruction time and an audio including at least a part of audio features at the capture instruction among audios being continuous with the audio at the capture instruction time, and
- the setting time section is a section corresponding to a predetermined reproduction time including the capture instruction time.

20. A capturing apparatus for capturing a moving picture from a moving picture stream being reproduced by a reproducing apparatus, the capturing apparatus comprising:
- a temporary memory for temporarily storing audio data and video data decoded from the moving picture stream;
- an input interface for inputting a capture instruction;
- a controller for determining a moving picture feature section at a capture instruction time as a capture section for the stored audio data and video data, and for capturing audio data and video data corresponding to the capture section from the temporarily stored audio data and video data decoded from the moving picture stream; and
- a capture memory for storing the captured video data and audio data from the temporarily stored audio data and video data decoded from the moving picture stream,
- wherein the controller detects a start point of one section of a video feature section, an audio feature section, a setting time section according to a preset capture start point priority and an end point of one section according to a preset capture end point priority from the audio data and the video data decoded from the moving picture stream, and determines the detected start point and end point as a start point and an end point of the capture section,
- wherein the video feature section is a section which includes a video at the capture instruction time and a video including at least a part of video features at the capture instruction time among videos being continuous with the video at the capture instruction,
- the audio feature section is a section which includes an audio at the capture instruction time and an audio including at least a part of audio features at the capture instruction among audios being continuous with the audio at the capture instruction time, and
- the setting time section is a section corresponding to a predetermined reproduction time including the capture instruction time.

* * * * *